Oct. 12, 1948.  W. W. WATKINS  2,451,420
ARTIFICIAL YARNS AND PROCESS OF PRODUCING THE SAME
Filed March 19, 1947
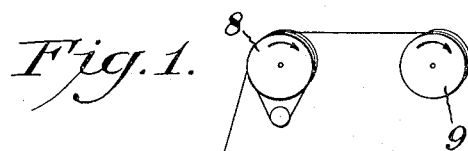
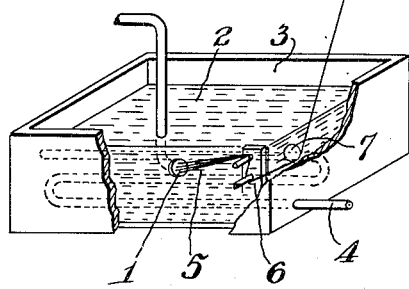
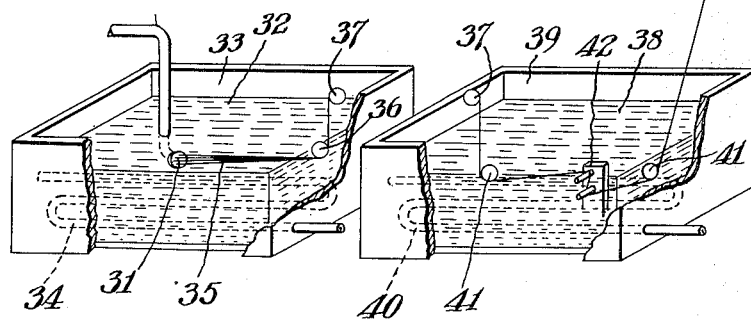
INVENTOR.
William W. Watkins
BY
ATTORNEY Patented Oct. 12, 1948

2,451,420

UNITED STATES PATENT OFFICE 2,451,420

ARTIFICIAL YARNS AND PROCESS OF PRODUCING THE SAME

William W. Watkins, Waynesboro, Va., assignor to E. I. du Pont de Nemours & Company, Wilmington, Del., a corporation of Delaware Application March 19, 1947, Serial No. 735,666

4 Claims. (Cl. 18—54)

This invention relates to shaped articles, such as yarns, films, bristles, tubings and the like, of acrylonitrile polymers. More particularly, the invention relates to a process for wet-spinning or casting of acrylonitrile polymers to obtain shaped articles possessing a high tenacity, a desirable elongation and a lustrous appearance and being substantially free of voids.

This case is a continuation in part of application Serial No. 496,376, filed July 28, 1943, now Patent No. 2,426,719.

Although the process of this invention is generally applicable to the production of any shaped article of an acrylonitrile polymer, it will, for convenience, be discussed in connection with the wet-spinning of yarns of acrylonitrile polymer.

Acrylonitrile polymers possess, in addition to other desirable properties, a high degree of toughness and insolubility in and resistance to the action of common solvents. British Patent No. 459,596 discloses that acrylonitrile polymers are soluble in highly concentrated aqueous solutions of hydrated salts, such as lithium bromide, zinc chloride and sodium sulfocyanate, and that the polymers can be precipitated from such solutions by the addition of water, aqueous salt solutions or acids. When such solutions of acrylonitrile polymers are extruded into the aforementioned precipitating liquids with the view of obtaining shaped articles such as yarns, films, etc., the shaped articles are extremely weak and filled with voids. They are so extremely brittle that they are practically incapable of being used as yarns or films. Moreover, particularly in the case of multi-filament yarns, the individual filaments tend to stick together to form a single, rigid structure.

British Patent No. 461,675 discloses that acrylonitrile polymers can be dissolved in molten quaternary ammonium salts, such as benzyl pyridinium chloride and reprecipitated by the addition of water, dilute salt solutions or acids. However, shaped articles prepared by the extrusion of such solutions into these liquids are also weak, filled with voids and extremely brittle. They are equally incapable of being used as yarns or films.

More recently, it has been discovered that acrylonitrile polymers can be dissolved in certain volatile organic solvents, and shaped articles, such as yarns, films, etc., of the polymer have been obtained by extruding such solutions into precipitating baths of the type mentioned above. The structures obtained in this manner differ from those obtained from the previously proposed acrylonitrile polymer solutions in that they are not so extremely brittle. Moreover, in the case of a multi-filament yarn, the individual filaments do not appear to be matted or stuck together. However, the structures still posses numerous voids throughout their length and the yarns possess too low a tenacity and elongation to permit them to be used in the textile art.

It is an object of this invention to provide an improved process for the wet-spinning of an acrylonitrile polymer yarn and produce thereby a yarn that possesses a sufficiently high tenacity and elongation to render it suitable for use in the textile art, has a lustrous appearance, and is substantially free of voids along its length. Another object of this invention is to provide an improved spinning bath for use in such process. Other objects will become apparent from the description of the invention hereinafter set forth.

The objects of this invention are accomplished, in general, by the steps of extruding a solution of an acrylonitrile polymer in a volatile organic solvent through a shaped orifice into a spinning bath heated to a temperature of at least 100° C. and comprising a liquid that is a non-solvent for the polymer but is capable of producing a compact yarn, i. e. a yarn having an "area ratio" of not more than 2.1, passing the yarn through the bath for a distance sufficiently long to substantially completely coagulate it, and maintaining the yarn during at least the latter portion of its travel through the bath under a tension of at least 0.5 gram per denier.

The following description of the process of this invention and the examples showing its practice will be more clearly understood if reference is made to the accompanying drawings wherein:

Figure 1 illustrates diagrammatically a preferred apparatus suitable for use in the practice of this invention; and Figure 2 illustrates diagrammatically a modified form of apparatus that is also suitable for use in the practice of this invention.

Referring now to Figure 1, the reference numeral 1 indicates a multi-hole spinneret through which an acrylonitrile polymer solution is extruded into a spinning bath 2 contained in a trough 3 provided with heating coils 4. In its travel through the spinning bath 2, the yarn 5 formed by the coagulaton of the polymer s subjected to tension by tension means comprising a pair of stationary snubbing pins 6. The tensioned yarn, after being led through the bath for the remainder of its travel by a guide 7, is passed without slippage about a positively driven roller or feed wheel 8, and the yarn is subsequently passed to a collecting device, such as a rotating bobbin 9.

Referring now to Figure 2 wherein a modified form of apparatus for use with the invention is illustrated, the reference numeral 31 designates a multi-hole spinneret through which an acrylonitrile polymer solution is extruded into a spinning bath 32 contained in a trough 33, provided with heating coils 34 capable of maintaining the bath at a temperature of at least 100° C. The yarn 35 is led through the bath 32 by a guide 36 and is conducted over guides 37 which serve to lead the yarn 35 from the bath 32 into a bath 38 contained in a trough 39, which is also provided with heating coils 40 capable of maintaining the bath 38 at a temperature of at least 100° C., and preferably 150° C. or higher. Roller guides 41 serve to lead the yarn 35 through the bath 38. The roller guides 36, 37 and 41 are of the type which exert no substantial tension on the yarn passing thereover or thereunder.

A tension device 42, which comprises a pair of stationary snubber pins 43, is mounted in the bath 38 in the path of travel of the yarn 35 therein and it imparts a tension to the yarn passing therethrough. The tensioned yarn is then withdrawn from the bath by a positively driven feed wheel 44 and passed to a collection device, such as a rotating bobbin 45.

In the following examples, which illustrate preferred methods of practicing this invention, the parts are by weight.

Example I

A solution of 18 parts of acrylonitrile polymer possessing an average molecular weight of approximately 120,000, as determined from viscosity measurements by the Staudinger formula, in 82 parts of dimethyl formamide is extruded at a temperature of 100° C. (viscosity of 450 poises) through a 10-hole spinneret (hole diameter of 0.005 inch) into a spinning bath consisting of glycerol heated to a temperature of 140° C., the solution being extruded at a jet velocity of 470 inches per minute. The yarn is led through the bath for a total distance of 24 inches, the yarn being subjected during its travel to a tension of 1.2 grams per denier by means of a snubbing tension guide comprising two stationary pins mounted at a distance of 16 inches from the spinneret face. On leaving the bath, the yarn is passed without slippage about a positively driven feed roll possessing a peripheral speed of 3600 inches per minute, the yarn being subsequently collected on a rotating bobbin possessing a constant peripheral speed of this same value. The fully wound bobbin package is then washed free of glycerol with water and dried. The yarn possesses a tenacity of 4.7 grams per denier and an elongation of 7%. It possesses knot and loop tenacities of 2.2 and 2.5 grams per denier respectively. The yarn is not brittle and is eminently suited for use as a reinforcing member or for use in the textile art. If desired, the elongation of the yarn can be further increased (to a value of 18% to 22% or more) without at the same time causing any appreciable loss in tenacity by subjecting the yarn, while still in the form of a bobbin package, to a prolonged heat treatment, as described in copending application of Shirleigh Silverman (Q–107L), Serial No. 496,396, now Patent No. 2,445,042, filed July 28, 1943. When this yarn is heated on the bobbin package for a period of 2 hours at a temperature of 150° C., the yarn will possess a tenacity of 4.6 grams per denier and an elongation of 18%.

Example II

The acrylonitrile polymer solution of Example I is extruded in the manner of that example into a spinning bath consisting of a 40% aqueous solution of calcium chloride maintained at a temperature of between 90° C. and 100° C. The yarn is led through the bath for a total distance of 20 inches and, during its travel through the bath, the yarn is subjected to a tension of 0.7 gram per denier, this being accomplished by passing the yarn around and about a straight pin mounted 15 inches from the spinneret face. The yarn is then collected and purified as in Example I. The purified, dried yarn possesses a tenacity of 3.2 grams per denier and an elongation of 7%.

Example III

A 14% solution of acrylonitrile polymer possessing an average molecular weight of approximately 140,000 in dimethyl formamide is extruded at a temperature of 100° C. through a spinneret having 10 holes, each hole being 0.005 inch in diameter, into a spinning bath consisting of glycerol maintained at a temperature of 120° C. The yarn passes through this bath for a distance of 24 inches in the manner of Figure 2 of the accompanying drawings, no tensioning devices being mounted in this bath. After leaving this bath, the yarn is passed into a second bath consisting of glycerol heated to a temperature of 170° C. The yarn is led through this second bath for a distance of 23 inches, the yarn being subjected during this travel to a tension of 0.9 gram per denier by two snubbing pins, mounted 7 inches from the far end of this second bath travel. The tensioned yarn is withdrawn from this second bath by means of a feed wheel possessing a peripheral speed of 1700 inches per minute, the yarn passing about this feed wheel without slippage. The yarn is collected without further stretching on a rotating bobbin. The yarn is purified and dried in the manner of Example I and twisted to 4 turns per inch. The yarn possesses a dry tenacity of 6.4 grams per denier, a loop tenacity of 4.0 grams per denier, and an elongation of 10%. When heated under tension to temperatures of 150° C., the yarn shows substantially no loss in tenacity and only a slight gain in elongation. On the other hand, when heated in the relaxed manner described in copending application of Shirleigh Silverman (Q–107L), Serial No. 496,396, filed July 28, 1943, the yarn acquires an elongation of 20%, while its tenacity drops to only 5.9 grams per denier.

The acrylonitrile polymer, of which the shaped articles are formed, is preferably prepared by the ammonium persulfate catalyzed polymerization of monomeric acrylonitrile dissolved or emulsified in water. It can, however, be prepared by any other suitable type of polymerization reaction, such as, for example, the emulsion-type reaction disclosed by United States Patent No. 2,160,054 to Bauer et al.

The polymer, of which the shaped articles are formed in accordance with this invention, must of course be of a sufficiently high molecular weight to possess film- or filament-forming properties. The polymer employed possesses an average molecular weight within the range of 25,000 to 750,000, or even higher, and preferably within the range of 40,000 to 250,000, as calculated from viscosity measurements by the Staudinger equation:

$$\text{Molecular weight} = \frac{N_{sp}}{K_m C}$$

wherein $K_m = 1.5 \times 10^{-4}$ $N_{sp} = \text{specific viscosity} = \dfrac{\text{viscosity of solution}}{\text{viscosity of solvent}} - 1$ and C = concentration of the solution expressed as the number of moles of the monomer (calculated) per liter of solution.

The molecular weight of the polymer obtained is dependent on such factors as the concentration of the monomer in the water, the amount and type of catalyst present, the temperature of the reaction, etc. When the monomer is present in 5% aqueous solution maintained at a temperature of from 3° C. to 5° C., it is found that the use of 4% of ammonium persulfate catalyst (based on the weight of the acrylonitrile) results in the formation of a polymer having a molecular weight (as calculated by the above equation) of approximately 60,000. Increasing or decreasing the amount of the catalyst, while maintaining the other conditions constant, decreases or increases the molecular weight of the polymer. The polymer preferably comprises a simple polymer of acrylonitrile. However, interpolymers of acrylonitrile and other polymerizable substances, such as vinyl acetate, vinyl chloride, esters or other derivatives of acrylic or metacrylic acids, styrene, isobutylene and other polymerizable substances, may also be used. However, for the final yarn to possess the desirable properties of polymerized acrylonitrile (such as resistance to acids and common solvents), it is necessary that the polymer contain a major portion of acrylonitrile, and those polymers that are prepared from at least 80 parts of acrylonitrile and no more than 20 parts of another polymerizable substance are perferred.

The polymer can be dissolved in any suitable solvent. However, it is preferred that the solvent comprise a volatile organic substance. The term "volatile organic solvent," as used in this specification, is meant to include those organic substances that are capable of forming stable homogeneous solutions with an acrylonitrile polymer and that can be distilled without decomposition at atmospheric pressure. Suitable volatile organic solvents for use with this invention include dimethyl formamide, dimethyl methoxy-acetamide, N-formyl morpholine, N-formyl hexamethylene imine, butadiene cyclic sulfone, tetramethylene cyclic sulfone, p-phenylene diamine, and the m- and p-nitrophenols, as mentioned in copending application to Houtz, Serial No. 447,446, now abandoned. This class of substances is further exemplified in U. S. Patents Nos. 2,404,714–2,404,728, inclusive. Accordingly, any volatile organic solvent which forms the requisite polymer solutions and which has the desired stability may be used in the process of this invention.

The preferred concentration of the spinning solution is, of course, dependent on the average molecular weight of the polymer employed, it generally being desirable to use more dilute solutions in the spinning of polymers of high molecular weight. In general, it is preferred that the solution contain from 10% to 30% of the polymer, and a 17% solution of an acrylonitrile polymer possessing an average molecular weight of 120,000 is admirably suited for use with the invention. When the solution is to be extruded through a conventional type orifice, it should possess a viscosity of from 50 to 500 poises, this viscosity being obtained by properly adjusting the temperature of the solution prior to extrusion. In general, solution temperatures of from 100 to 150° C. are preferred.

As indicated in the above examples, spinning baths comprising glycerol heated to a temperature of 140° C. or an aqueous 40% solution of calcium chloride at a temperature of 100° C. are eminently suited for use in the spinning of desirable yarns of an acrylonitrile polymer. However, the invention is not limited to the use of these specific baths. Any liquid that is capable of precipitating the polymer from solution to form a yarn having an area ratio of not more than 2.1 can be used as the spinning bath of this invention. As shown in the table hereafter set forth, liquids meeting this requirement include not only such organic substances as glycerol and triethanolamine but also aqueous solutions containing from 30% to 50% of an inorganic salt, such as calcium chloride, sodium thiocyanate and other highly hydrated salts, such as the halides of lithium. On the other hand, liquids, such as ethylene glycol, carbitol, water, dilute solutions of inorganic salts, etc., that do not meet this requirement are not suited for use with the invention. Yarns formed in the latter baths are brittle and are filled with large, undesirable voids. They cannot be subjected, without breaking, to the high spinning tensions required to produce strong yarns.

The exact reason for the desirable action of these baths on an extruded solution of an acrylonitrile polymer is not clearly understood but it is believed to be the result of a gradual, rather than a rapid, precipitating or coagulating action of the bath on the extruded solution. In any event, it has been found that the baths of this invention act to precipitate the polymer in the form of a more compact structure than do the baths of the prior art. This compactness of structure can be shown by determining the "area ratio" of the yarn obtained. This term "area ratio" refers to the ratio of the measured cross-sectional area of the individual filaments of an acrylonitrile polymer yarn to the theoretical cross-sectional area of those filaments as calculated from the denier of the yarn and the known density of the polymer (1.165 for an acrylonitrile polymer prepared according to the method of U. S. Patent No. 2,140,048 to Fikentscher and possessing an average molecular weight of 120,000, as determined from viscosity measurements by the Staudinger formula).

The following table indicates the area ratio of yarns obtained by spinning an acrylonitrile polymer solution into various baths, including the baths of this invention. In each case, the yarn was prepared by extruding a 20% solution of an acrylonitrile polymer, possessing an average molecular weight of 120,000, in dimethyl formamide into the desired bath, the spinning solution being heated prior to extrusion to a temperature of 100° C. and extruded through a 40-hole spinneret having a hole diameter of 0.003 inch. The solution was extruded at a rate of 4.2 grams per minute and the yarn, after a total bath travel of 24 inches, was collected on a bobbin at a rate of 860 inches per minute (equal to the calculated jet velocity employed). The yarn was then washed with water and dried on the bobbin. The denier of the yarn was then determined by weighing 90 cm. lengths, from which value the calculated cross-sectional area of the filaments (column 5 of the table) was determined by the formula:

$$\text{Area (cm}^2 \times 10^5) = \frac{\text{yarn denier}}{9 \times \text{density of polymer} \times \text{no. of filaments in yarn}}$$

In all cases, a value of 1.165 was used for the density of the polymer. The measured cross-sectional area of the filaments (column 4 of the table) was determined by direct measurement of the cross-sectional area (magnified 500 times) with a planimeter. In each case, the cross-sectional area of each of the 40 filaments in the yarn was determined, the value in the table representing the average of these individual measurements.

Table

| Spinning Bath | Bath Temp., °C. | Denier of Yarn | Cross-Sectional Area Filaments (av.) (cm² .10⁵) | | Area Ratio (Measured Area) (Calculated Area) |
|---|---|---|---|---|---|
| | | | Measured | Calculated | |
| 40% CaCl₂ (aq.) | 105 | 344 | 1.14 | 0.822 | 1.39 |
| Glycerol | 140 | 341 | 1.38 | 0.815 | 1.70 |
| 40% NaSCN (aq.) | 115 | 300 | 1.51 | 0.72 | 2.1 |
| Triethanolamine | 140 | 304 | 1.46 | 0.73 | 2.0 |
| 30% NaSCN (aq.) | 100 | 344 | 1.93 | 0.822 | 2.35 |
| 10% H₂SO₄ | 100 | 308 | 1.77 | 0.74 | 2.4 |
| Carbitol | 140 | 341 | 2.02 | 0.815 | 2.48 |
| Ethylene glycol | 140 | 347 | 2.20 | 0.829 | 2.66 |
| 20% CaCl₂ (aq.) | 100 | 341 | 2.21 | 0.815 | 2.72 |
| Water | 95 | 327 | 2.24 | 0.782 | 2.87 |

As shown by this table, the area ratio of an acrylonitrile polymer yarn prepared by the wet-spinning technique is greatly affected by the composition of the spinning bath employed and this invention is based on the discovery that the desirable physical properties of such a yarn are inversely related to the area ratio of the yarn as spun. Yarns spun in baths which, when tested in the above manner, yield a yarn having an area ratio greater than 2.1 are generally undesirable. They possess large voids and cannot be stretched to form yarns possessing a high tenacity, i. e., a tenacity of the order of 4 grams per denier or higher. On the other hand, yarns spun in the baths of this invention (these baths which, when tested as above, yield yarns having an area ratio of not more than 2.1) are substantially free of voids and can be subjected without breaking to relatively high spinning tensions (of the order of 0.7 gram per denier or more) to yield oriented yarns that possess a high tenacity and a good elongation and that are generally suited for use in the textile art.

The description previously set forth indicates that the spinning baths of this invention should be maintained at a temperature of 100° C. or higher, for example, 140° C. However, there is nothing critical about this temperature and, generally speaking, the bath can be maintained at any desired temperature, provided only that the bath at that temperature is capable of precipitating the polymer in the form of a yarn possessing an area ratio of not more than 2.1. The bath temperature should, of course, not exceed the boiling point of the solvent employed in the spinning solution. If it does, undesirable boiling of the solvent will occur with the resultant formation of minute bubbles in the yarn.

It is generally preferred in the practice of this invention to employ a bath travel of the order of 20 to 25 inches. However, this is not essential and bath travels as short as 4 inches can be used if desired. On the other hand, much longer bath travels of the order of 100 to 200 or more inches can also be used. Such long bath travels are especially useful in the spinning of a heavy denier yarn or a large bundle of filaments intended for conversion into staple fibers.

As already mentioned, the baths of this invention, in distinct contrast to previously proposed baths for the spinning of acrylonitrile polymer yarns, make possible the application of an appreciable tension to the yarn during the spinning operation. The process of this invention includes, as one step, the use of such tension, the tension preferably being of the order of at least 0.5 gram per denier. As shown in the examples, admirable results are obtained by the use of tensions of the order of 0.7 to 1.2 grams per denier, and these tensions or even higher ones, for example as high as 1.7 grams per denier, can be used if desired. It is generally preferred to apply this tension to the yarn over a relatively short range of bath travel, for example, by means of one or more snubbing bars mounted in the bath. However, this is not critical to the invention and other types of tension devices, such as a plurality of roller guides, etc., can also be used, either alone or in conjunction with one or more stationary snubbing bars. In most cases, it is preferred to apply the tension to the yarn only during the latter portion of its bath travel. However, this is not essential and the tension can, if desired, be applied at an earlier stage. As a matter of fact, satisfactory results can be obtained when the tensioning device is mounted within one inch of the spinneret face.

As indicated in Example III above, the process of this invention lends itself admirably to use with a double-bath set-up, the yarn being first passed through a primary bath (preferably heated to a temperature of 100° C.) for a distance sufficient to completely coagulate the yarn and then led through a second bath heated to a much higher temperature, at which time it can be subjected to a high stretching tension by suitable devices mounted in this bath. As in the single-bath set-up, it is preferred but not essential that this high tension be applied to the yarn over a very short range by a tensioning device positioned at a point approximately two-thirds along the length of this second bath travel. The primary and secondary baths employed in this double-bath spinning set-up are preferably of the same composition and comprise liquids that are capable of precipitating an acrylonitrile polymer from solution in the form of a yarn possessing an area ratio of not more than 2.1. However, this is not essential and the baths can, if desired, differ in their composition. It is only necessary that the liquid comprising the first or primary bath be such a liquid and that the second bath comprise a liquid that is incapable of dissolving an acrylonitrile polymer, and that is maintained at an elevated temperature, for example a temperature of 100° C. to 140° C.

On leaving the spinning bath, the yarn is collected in suitable package form, preferably on a rotating bobbin under somewhat reduced tension. The yarn package is then washed to free it of occluded spinning bath and dried. If desired, a finishing agent may be applied to the yarn at the end of the washing operation and the dried yarn twisted and wound into final package form for commercial use. The yarns are bright, lustrous, and free of voids. Their filaments have substantially non-crenulated surfaces and are ellipsoidal in cross-section. The yarns possess dry tenacities of from 3 to 6.5 or 7 grams per denier, together with elongations of from 13% to 10%. They possess desirable knot and loop tenacities. Moreover, when heated under tension for extended periods of time, the yarns show a remarkable retention of tenacity with only a very slight gain in elongation; for example, a typical yarn possessing a tenacity of 4.2 grams per denier and an elongation of 13% will possess, after being heated for one hour at 100° C. under tension, a tenacity of 4.1 grams per denier and an elongation of 13%. This is quite surprising in view of the normal behavior of polymeric yarns which customarily show a marked loss in tenacity (30% to 40%) and a sharp gain in elongation (100% or more of the original value) when treated in such a manner. This remarkable property of the yarns of this invention makes them eminently suited for many purposes.

On the other hand, if the purified dried yarns of this invention are heated in a relaxed state to temperatures of the order of 130° C. to 200° C., in accordance with the teachings of copending application (Q-107L), Serial No. 496,396, filed July 28, 1943, the yarns do tend to shrink somewhat and such an after-treatment can be used to increase the elongation of the yarns to a point where they are satisfactory for use in the textile art. It is only in the case of yarns possessing a very high tenacity (for example a tenacity of 6.4 grams per denier) that any appreciable loss in tenacity is occasioned by this treatment. Even then, the tenacity does not usually fall below 4.5 grams per denier. On the other hand, when the dried yarn possesses a dried tenacity of 4 grams per denier or less, this relaxed heating treatment serves to increase both the elongation and the tenacity, the final yarn in any event possessing a tenacity of 4.5 to 5 grams per denier and an elongation of from 18% to 25%.

This invention provides a class of spinning baths that is eminently suited for use in the wet-spinning of acrylonitrile polymer yarns. It also provides a wet-spinning process for the manufacture of such yarns, which yarns possess a desirable tenacity and elongation and are eminently suited for use in the textile art. The freshly spun yarns of this invention are lustrous and free of voids. Any voids that are present are submicroscopic in size and are not visible when examined under a magnification of 500 times. The yarns are not brittle. Moreover, the yarns exhibit an unexpectedly high retention of their tenacity and elongation on exposure under tension to elevated temperatures.

The process of this invention makes it possible to produce such highly desirable yarns in a single spinning operation without the use of additional after-treatments of any sort. However, if desired, the yarns can be subjected to a simple after-treatment to greatly improve elongation without at the same time causing any marked lowering in tenacity or loss of other desirable properties. The process of this invention does not require the use of complicated apparatus. It can be performed on existing machinery of the type employed, for example, in the wet-spinning of viscose rayon yarns.

Since it is obvious that many changes and modifications can be made in the above-described details without departing from the nature and spirit of the invention, it is to be understood that the invention is not to be limited thereto except as set forth in the appended claims.

I claim:

1. A process for wet-spinning of acrylonitrile polymer yarn which comprises extruding a solution, in a volatile organic solvent, of acrylonitrile polymer containing a major portion of acrylonitrile, through a shaped orifice into a spinning bath consisting of an aqueous 30% to 50% (by weight) solution of calcium chloride.

2. A process for wet-spinning of acrylonitrile polymer yarn which comprises extruding a solution, in a volatile organic solvent, of acrylonitrile polymer containing a major portion of acrylonitrile, through a shaped orifice into a spinning bath consisting of an aqueous 30% to 50% (by weight) solution of calcium chloride heated to a temperature of at least 90° C.

3. A process for wet-spinning of acrylonitrile polymer yarn which comprises extruding a solution, in a volatile organic solvent, of acrylonitrile polymer containing a major portion of acrylonitrile, through a shaped orifice into a spinning bath consisting of an aqueous 30% to 50% (by weight) solution of calcium chloride heated to a temperature of at least 90° C., passing the yarn through said bath until it is substantially completely coagulated and subjecting the yarn during its travel through the bath to a tension of at least 0.5 gram per denier.

4. A process of wet spinning of acrylonitrile polymer yarn which comprises extruding a solution in dimethyl formamide of acrylonitrile polymer containing a major portion of acrylonitrile, through a shaped orifice into a spinning bath consisting of an aqueous 30% to 50% (by weight) solution of calcium chloride.

WILLIAM W. WATKINS.

REFERENCES CITED

The following references are of record in the file of this patent:

UNITED STATES PATENTS

| Number | Name | Date |
|---|---|---|
| 2,012,177 | Voss et al. | Aug. 20, 1935 |
| 2,117,210 | Rein | May 10, 1938 |
| 2,236,061 | Izard | Mar. 25, 1941 |
| 2,356,767 | Kropa | Aug. 29, 1944 |

Certificate of Correction

Patent No. 2,451,420.                                           October 12, 1948.

WILLIAM W. WATKINS

It is hereby certified that errors appear in the printed specification of the above numbered patent requiring correction as follows:

Column 2, line 5, for "posses" read *possess*; line 50, for "polymer s" read *polymer is*; column 5, line 35, for the syllable "meta-" read *metha-*;

and that the said Letters Patent should be read with these corrections therein that the same may conform to the record of the case in the Patent Office.

Signed and sealed this 11th day of January, A. D. 1949.

[SEAL]

THOMAS F. MURPHY,
*Assistant Commissioner of Patents.*